Jan. 22, 1935.  T. T. HAAG  1,988,654
FILM VIEWING CABINET
Filed April 12, 1934   2 Sheets-Sheet 1
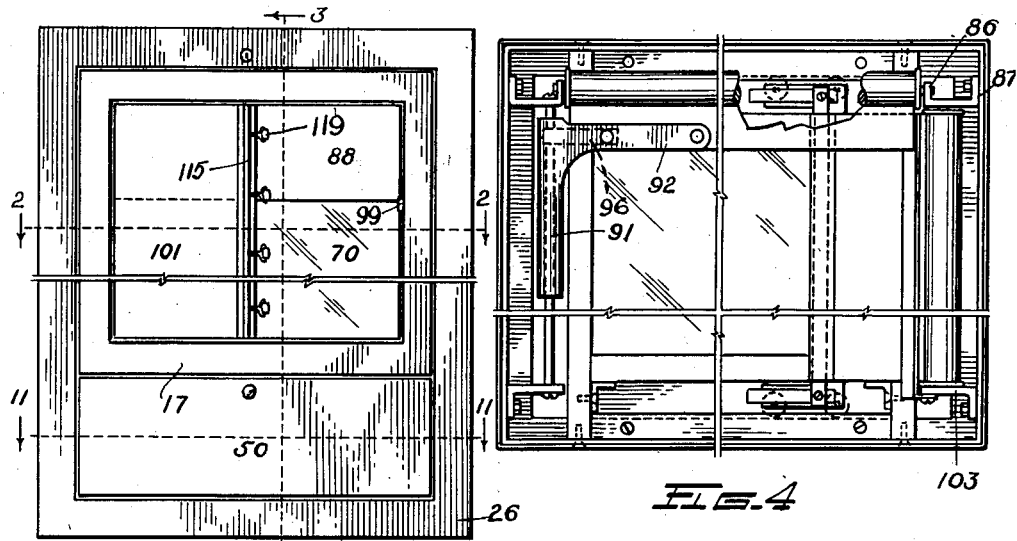
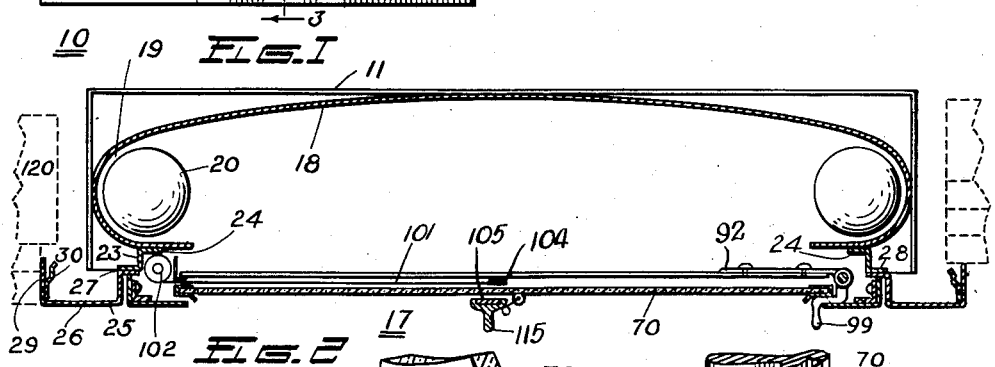
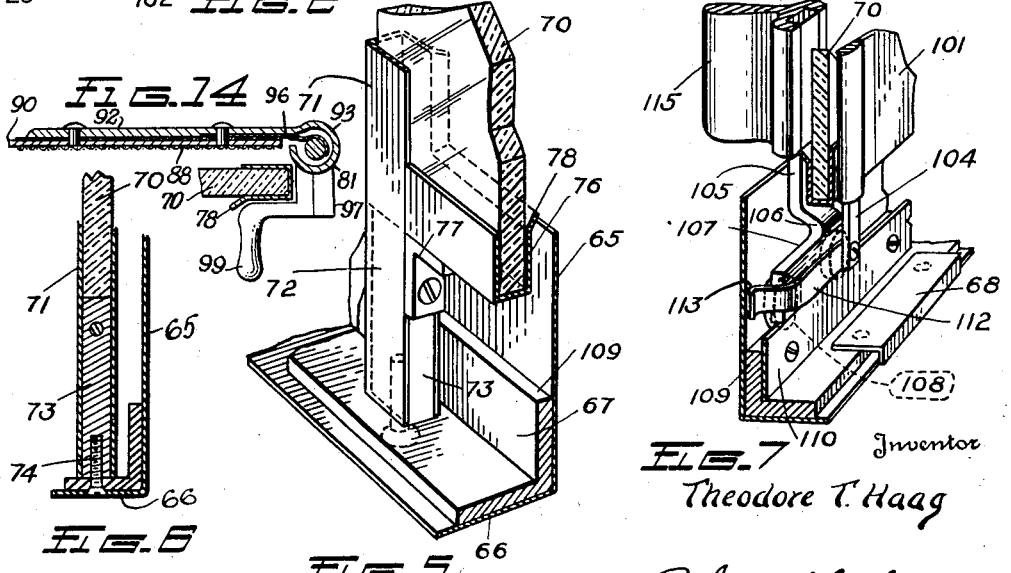
Inventor
Theodore T. Haag
By Richmond S. Hayes
His Attorney Jan. 22, 1935.  T. T. HAAG  1,988,654
FILM VIEWING CABINET
Filed April 12, 1934  2 Sheets-Sheet 2
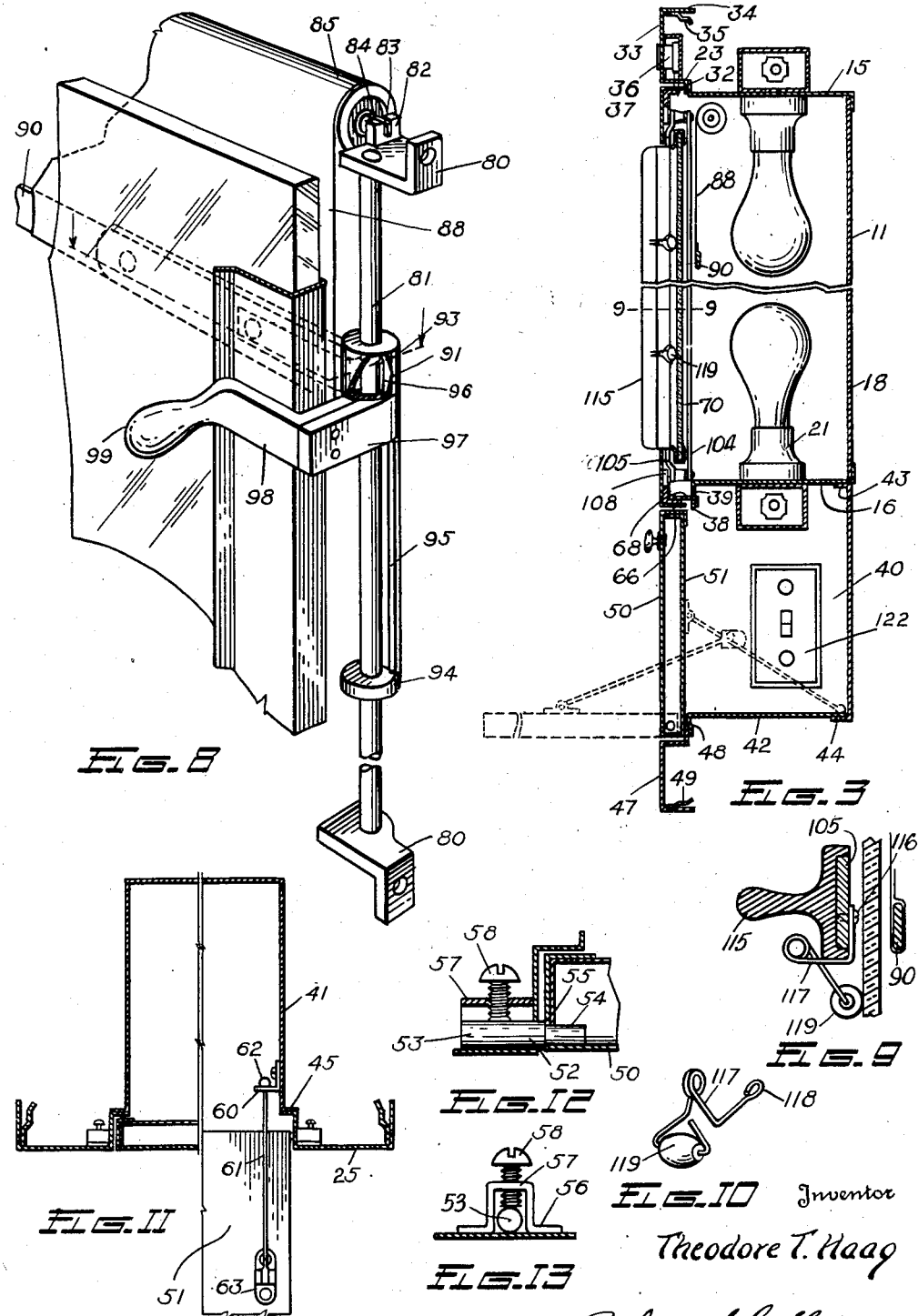
Inventor
Theodore T. Haag
By Richmond S. Hayes
His Attorney Patented Jan. 22, 1935

1,988,654

UNITED STATES PATENT OFFICE 1,988,654

FILM VIEWING CABINET

Theodore T. Haag, Jamestown, N. Y., assignor to Jamestown Metal Equipment Company, Inc., Jamestown, N. Y., a corporation of New York Application April 12, 1934, Serial No. 720,258

18 Claims. (Cl. 40—132)

This invention relates to an improvement in film viewing cabinets for wall or pedestal mounting.

The preferred embodiment of the invention discloses a cabinet adapted to become a part of hospital equipment for use in viewing all kinds and sizes of X-ray films. Two independently operable curtains are provided for the purpose of masking the unused portion of the viewing glass adjacent a given sized film. One of the curtains is provided with means for securing the film in place against the glass and, when moved to secure the film, masks the unused portion of the glass adjacent thereto. Access to the light control of the device is had through a compartment beneath the viewing portion of the cabinet, the closure for this compartment, when open, constituting a shelf upon which films may be examined or sorted.

One of the objects of the invention is to provide a film viewing cabinet suitable for wall or pedestal mounting.

Another object of the invention is to provide a film viewing cabinet which is particularly adaptable for use as a part of hospital equipment.

A further object of the invention is to provide a film viewing cabinet having adjustable masking curtains by which to frame any standard size film.

A still further object of the invention is to provide a film viewing cabinet having adjustable means for securing all standard size films.

Another and further object of the invention is to provide a film viewing cabinet in which the viewing glass is entirely circumscribed by a ventilating opening.

Other and further objects of the invention will be more fully understood from a consideration of the following specification which is taken in conjunction with the accompanying drawings and in which;

Figure 1 is a front elevation of one modification of the invention;

Figure 2 is an enlarged horizontal sectional view of the cabinet taken substantially on the line 2—2 of Figure 1;

Figure 3 is an enlarged vertical sectional view of the cabinet taken substantially on the line 3—3 of Figure 1;

Figure 4 is a rear elevation of the viewing glass and shows the means for supporting a pair of adjustable masking curtains;

Figure 5 is an enlarged fragmentary perspective view of one corner support for the viewing glass;

Figure 6 is another fragmentary view of the viewing glass support;

Figure 7 is a fragmentary perspective view showing the method of connecting the horizontally movable masking curtain with an operating member;

Figure 8 is a fragmentary perspective view showing the method of connecting a vertically movable masking curtain with an operating lever;

Figure 9 is an enlarged horizontal sectional view taken substantially on the line 9—9 of Figure 3 and shows the relationship between the curtain operating member and the film securing means;

Figure 10 is a perspective view of one of the spring mounted rollers utilized to secure the film against the viewing glass;

Figure 11 is a horizontal sectional view taken substantially on the line 11—11 of Figure 1 and shows the compartment closure in position for use as a shelf;

Figures 12 and 13 are enlarged fragmentary views of the pivotal supporting means for the compartment closure; and Fig. 14 is a cross-sectional view of a detail of the invention.

Inasmuch as one specific modification of a film viewing cabinet must be shown and described for the purpose of providing a complete understanding of the invention, a cabinet of the type suitable for use as a part of hospital equipment is described. It will be understood, however, that any reference to parts of the device in the terms used in describing hospital equipment shall not constitute a limitation on modifications for other uses.

Reference is now had to the drawings in which the numeral 10 is employed to designate one modification of the invention adaptable for use as a part of hospital equipment. The cabinet includes a rectangular compartment 11 having a top wall 15, and bottom wall 16. The front of the compartment is closed by a door 17. The sides and rear of the compartment 11 are formed by a reflector 18 which is straight in vertical section and curved in horizontal section. The central portion of the reflector is formed through a slight curvature which increases to form end pockets 19 adjacent the inwardly directed flanges of the top and bottom walls 15 and 16. The particular curvature of the main portion of the reflector depends on the size of the compartment but is under all circumstances shaped to provide uniform light distribution. Within the pockets 19 is located the source of illumination. This illumination is provided by two sets of lamps 20, the number of lamps in each set depending upon the size of the cabinet and the type of film to be viewed. The lamps are mounted in sockets 21 which are secured in any conventional manner to the top and bottom walls 15 and 16 of the compartment 11. Connection with all lamps is had exteriorly of the compartment 11. Vertical members 23 are secured along their inner flanges 24 to the forward edges of the reflector 18. These members constitute a partial support for vertical portions 25 of a finish trim 26. These portions are joined along flanges 27 to the forward flanges 28 of the members 23. The trim is formed with rearwardly directed flanges 29, on the inner faces of which are located spring clips 30. The top wall 15 of the compartment is formed with an upwardly directed flange 32, to the forward face of which is secured a corresponding flange of the upper horizontal portion 33 of the trim 26. This portion of the trim is also provided with a return bent flange 34 having a spring clip 35 on the inner face thereof. A lock or latching member 36 is secured to the rear face of the portion 33 of the trim being provided with a downwardly movable bolt 37. The bottom wall 16 of the compartment terminates in a downwardly directed flange 38 having one or more horizontal slots 39.

Beneath the compartment 11 is a compartment 40 shown to be formed by a continuous side and rear wall 41 and removable bottom wall 42. The side and rear walls are provided, top and bottom, with horizontal flanges 43 and 44 respectively, flanges 43 being welded to the underface of wall 16 of the container and flanges 44 constituting a rest or support for the removable wall 42. The forward edges of the side and rear walls terminate in flanges 45. The compartment 40, in commercial practice, will form a part of the entire cabinet and will lie within the trim which surrounds the front face of the cabinet. Consequently the trim portions 25 will be secured along the lower portions of their flanges 27 to flanges 45. The upper edge of the horizontal portion 47 of the trim 26 seats the front flange 48 of the wall 42. The portion 47 also includes a spring clip 49 similar to clips 30 and 35. It will be understood that the elements 25, 33 and 47, which constitute the entire rectangular trim 26, are mitered and joined in any conventional manner.

The compartment 40 is provided with a hollow closure 50 which, when said closure is in open position, permits use of the inner face 51 as a shelf on which to lay and sort various films. The closure 50 is pivoted on the vertical portions 26 of the trim through a hinge structure which includes pins 52. Each pin 52 includes an enlarged and reduced portion 53 and 54 connected by an annular shoulder 55. The portion 54 projects through a suitable opening in the end wall of the closure to a point where the shoulder 55 abuts said wall. A U-shaped strap 56 is secured to the rear face of each of the elements 25. The base wall 57 of the strap is drilled and tapped to receive a set screw 58. The portion 53 of the pin lies within the strap 56 and is secured against dislodgement or rotation by the set screw 58. Mounted on one of the side walls of the compartment 40 is an angle bracket 60, the inwardly directed portion of which is formed with an opening to receive a closure supporting rod 61. This rod is provided with a head 62 at one end adjacent the bracket 60 and pivot plate 63 at the other end. The plate 63 is secured in any suitable manner to the shelf portion 51 of the closure 50.

The opening in the compartment 11 is closed by the door 17 which includes a viewing glass, masking curtains and film clips. This door comprises a rectangular frame 65 having inwardly directed flanges 66. A reinforcing plate 67 is secured to the inner face of each wall of the frame 67. The lower plate 67 (see Figure 3), has attached thereto a downwardly flanged strap 68 which projects through the slot 39 in flange 38 and constitutes the hinge support of the door. The upper horizontal plate 67 and the inturned flange 66 are slotted to receive the bolt 37. The viewing glass 70 is enclosed along its vertical edges by channel members 71. These members have extensions 72 above and below the horizontal limits of the glass which abut the horizontal portion of the top and bottom plates 67. A block 73 is secured within each of the extensions 72. Suitable means in the form of a screw 74 secures the block 73 to the frame 66 and plate 67. The upper and lower horizontal edges of the glass 70 lie within channel members 76. These members are secured to the vertical channel members 71 in any suitable manner as by angle brackets 77. It is to be noted that the front edge of each channel member 71 and 76 is formed with a flared portion 78. Attention is particularly directed to the fact that the framed glass 70, being spaced inwardly of the front edge of the door frame 65, provides a ventilating opening which entirely circumscribes the glass.

Angle plates 80 are located top and bottom of one of the vertical flanges 66 and have suitable openings therein by which to receive a guide rod 81. The upper plate 80 is provided with an upstanding block 82, the notch 83 of which receives the key plate 84 of a spring roller structure 85. The structure 85 is without palls and, when rotated to increase the tension of the spring, will tend immediately to rotate in the opposite direction. The other end of the roller structure 85 consists of a shaft which is mounted in an upstanding flange 86 of a corresponding angle plate 87.

Mounted on the structure 85 is an opaque masking curtain 88. The free edge of this curtain is fitted with a bar 90, to one end of which is secured a guide block 91. This block includes a horizontal arm 92 and upper and lower cylindrical portions 93 and 94 which are connected on one side by a strap portion 95. These cylindrical portions 93 and 94 each have an opening therethrough for receiving the guide rod 81. Secured to the horizontal arm 92 is a spring plate 96 which extends into the upper cylindrical portion 93 and frictionally engages the rod 81. Directly beneath the portion 93 is a forwardly directed horizontal strap 97. Secured to this strap is a plate 98 which terminates in a handle or knob operator 99. Examination of Figures 2 and 8 disclose the facts that the plate 98 projects through the ventilating opening between the glass 70 and the frame 65 and the knob 99 lies adjacent the inner edge of a vertical portion of the frame 65. Consequently manual control of the vertically movable curtain 88 does not interfere with the mounting of films on the glass 70 nor does it block off viewing any portion of a film on the glass.

The guide block 91, being provided with friction means in the form of a plate 96 which engages the rod 81, acts to counteract the upward pull of the spring roller structure through the curtain 88. This frictional contact of the plate 96 is not effective against manipulation of the operating knob 99. Consequently the curtain 88 may be extended to any desired position and will so remain until further manipulation.

The horizontally movable masking curtain 101 is mounted on a roller 102 which is in turn supported in a vertical position through a lower angle plate 103 mounted adjacent the lower end of the vertical plate 66. The upper end of the roller is fitted into the central portion of the angle plate 87 which, as heretofore mentioned, supports one end of the horizontal roller structure 85 through flange 86. The roller 102 is normally under tension to roll the curtain 101 thereon. The free edge of the curtain is provided with operating means and braking means as well to counteract the spring tension of the roller 102. Secured to the free edge of the curtain is a bar 104 which extends above and below the curtain. As is evident from consideration of Figure 7, this bar is located adjacent the inner face of the viewing glass 70. A further bar 105 is located adjacent the outer face of the glass 70 and projects into the space, top and bottom, between the front flange of the frame 65 and the glass. The bar 105 has inwardly offset portions 106 above and beneath the glass which terminate in horizontal feet 107. Mounted on each foot 107, adjacent the frame 65, are rollers 108. These rollers are adapted to move along the edge 109 of angle plates 67, being prevented from inward lateral displacement by straps 110. The inner bar 104, to which the curtain 101 is joined, is secured at its ends to the inner face of feet 107. Interposed between cooperating bars 104 and feet 107 and secured thereto are spring plates 112. These plates extend parallel with the feet 107 being bent around the ends thereof to form friction brakes 113 which engage the inner face of the frame 65. The pressure of the plates 112 against the frame 65 constitutes sufficient frictional resistance to the spring tension of the roller 102 to permit adjustment of the curtain to any desired position. As above mentioned, the bar 105 is located adjacent the outer face of the viewing glass 70. Secured to or forming part of this bar is an operating member 115 which extends substantially the full distance between corresponding opposed edges of the frame 65. Since the free end of the curtain 101 is constrained to follow a definite horizontal path across the glass 70, due to the top and bottom roller support, it is immaterial what portion of the operating member 115 is grasped to move this curtain.

Reference is now had more particularly to Figures 9 and 10 wherein a disclosed means for securing one vertical edge of a film in contact with the glass 70. This means includes a number of spring clips 117, the ends 118 of which are secured by screws 116 to the bar 105. The other end of each clip 117 is shaped to receive and secure a roller 119. Due to the spring tension of the clip the roller at all times has pressure contact with the outer face of the glass 70.

Mention has been made of the provision of spring clips 30, 35 and 49 provided adjacent the inner face of the trim which surrounds the cabinet. These clips are adapted to receive and secure a finished shell (not shown) which encloses the entire rear portion of the cabinet adapting it for portable use. The present disclosure is, however, more preferably designed for wall mounting since there is only infrequent demand for a portable cabinet of this nature. An examination of Figure 2 discloses that the cabinet may be mounted flush with a building wall indicated by the numeral 120 or may overlap the building wall the depth of the trim flange 29. Inasmuch as the cabinet is of comparatively small depth, it is contemplated that it may be installed flush with a building wall of six or more inches in thickness.

The operation of the device briefly is as follows. The closure 50 is opened to a horizontal position thus providing the shelf 51. Access may now be had to the compartment 40 in which is located a light switch 122. If a number of films are to be examined, they may be placed upon the shelf 51 and arranged or assorted as desired. The selected film is placed against the outer face of the viewing glass 70, being moved to the lower right hand corner of the glass. The lower and right hand edges of the film are projected into the V-shaped pockets formed by flared portions 78 and the glass 70. The horizontally movable masking curtain 101 is moved across the glass to a position such that the film clip rollers engage the left hand vertical edge of the film. The film is now held in place against the glass on three sides which is sufficient to insure proper examination thereof. The vertically movable curtain 88 is now moved downwardly to a position adjacent the upper edge of the film. All light is thus masked off from the glass except that which projects through the film. It is here brought out that the front flanges 23 of the reflector 18 effectively block off the direct rays of the lamps 20. Consequently none but reflected light shows through the film, thus eliminating any bright spots which would tend to make examination of the film difficult.

Although applicant has shown and described only one modification of this invention it will be apparent to those skilled in the art that other modifications or adaptations of the invention are contemplated and may be made without departing from the spirit and scope of the invention as defined in the hereunto annexed claims.

Having thus set forth my invention what I claim as new and for which I desire protection by Letters Patent is:

1. In a film viewing cabinet having a compartment, a door closing the open side of said compartment, said door including a frame having flanges directed inwardly of said cabinet, a film viewing glass in said door, means framing said glass, said means being engaged with certain of said flanges and supporting said glass inwardly of and spaced from said door frame whereby to provide an opening into said compartment entirely circumscribing said glass.

2. In a film viewing cabinet having a compartment open on one side, a door closing said open side, said door including a frame having flanges directed inwardly of said cabinet, a film viewing glass in said door, channel members enclosing the vertical and horizontal edges of said glass, certain of said channel members having extensions secured to corresponding flanges of said frame, said channel members and said glass being spaced inwardly of said frame whereby to provide an opening into said compartment entirely circumscribing said glass.

3. In a film viewing cabinet having a compartment open on one side, a door closing said open side, a viewing glass in said door, means laterally spacing said glass from said door to provide an opening into said compartment entirely circumscribing said glass, a roller mounted in said door, a vertically movable masking curtain on said roller located adjacent the inner face of said glass, a bar secured to the free edge of said curtain, guide means for said bar, and further means connected with said bar, said further means projecting through said opening to the exterior of said cabinet and serving as an operator to move said curtain.

4. In a film viewing cabinet having a compartment open on one side, a door closing said open side, said door including a frame having flanges directed inwardly of said cabinet, a viewing glass in said door, means supporting said glass in spaced relationship to said frame to provide an opening into said compartment entirely circumscribing said glass, a spring tension roller in said door, a masking curtain on said roller, means on certain of said door flanges supporting said roller, movable guide means connected with the free edge of said curtain, and further means joined to said guide means, said further means projecting through said opening to the exterior of said cabinet and serving as an operator to move said curtain.

5. In a cabinet of the class described, a compartment door, a viewing glass in said door, said glass being entirely circumscribed by an opening, a masking curtain, a continuous tension spring roller supporting said curtain, a bar secured to the free edge of said curtain, a guide rod in said door, a guide block on said rod, said block being joined to one end of said curtain bar, means joined to said block, said means projecting past one edge of said glass and through said opening to the exterior of said cabinet whereby to provide an operator for moving said curtain.

6. In a cabinet of the class described, a compartment door, a framed viewing glass in said door, said glass being mounted to provide an opening from the interior to the exterior of said cabinet, said opening entirely circumscribing said glass, a masking curtain, a continuous tension spring roller supporting said curtain, a guide rod in said door, movable guide means on said rod joined to the free edge of said curtain, an operator adjacent the outer face of said glass connected through said opening with said guide means, said means normally frictionally engaging said rod whereby to locate said curtain in any extended position.

7. In a cabinet of the class described, a compartment door, a viewing glass in said door, said glass being supported to be entirely circumscribed by an opening connecting the interior with the exterior of said cabinet, a masking curtain, a continuous tension spring roller supporting said curtain, a bar secured to the free edge of said curtain, a guide rod, a movable guide block joined to said bar, connected cylindrical portions in said block mounted on said rod, and means frictionally engaging said rod whereby to secure said curtain in any extended position.

8. In a film viewing cabinet having a compartment open on one side, a door closing said open side, a framed viewing glass in said door, said glass being supported to be entirely circumscribed by an opening connecting the interior with the exterior of said compartment, a horizontally movable masking curtain adjacent the inner face of said glass, a continuous tension spring roller carrying said curtain, a curtain operating member adjacent the outer face of said glass, means projecting through said opening connecting said member with said curtain, and friction means on said means, said friction means serving to offset the spring tension of said roller whereby to facilitate locating said curtain in any extended position.

9. In a film viewing cabinet, a compartment door, a viewing glass mounted in said door, said glass being entirely circumscribed by an opening, a horizontally movable masking curtain adjacent the inner face of said glass, a continuous tension spring roller carrying said curtain, a bar joined to the free edge of said curtain, an operating member adjacent the outer face of said glass, a bar supporting said member, offset portions on said bar projecting through said opening above and beneath said glass, the ends of said curtain bar being joined to said portions, means movable with said curtain frictionally engaging said door, said means serving to offset the spring tension of said roller and facilitate locating said curtain in any extended position.

10. In a film viewing cabinet, a compartment door, a viewing glass mounted in said door, said glass being entirely circumscribed by an opening, a masking curtain adjacent the inner face of said glass, said curtain being carried by a spring tension roller mounted in said door, a bar joined to the free edge of said curtain, a further bar adjacent the outer face of said glass, offset portions on said further bar projecting through said opening above and beneath said glass and joined to the ends of said bar, friction means on said further bar contacting with said door, said friction means serving to prevent automatic rewinding of said spring roller when said curtain is extended.

11. In a film viewing cabinet having a compartment, a door, a viewing glass mounted in an opening in said door, said glass being entirely circumscribed by an opening connecting with said door opening, a masking curtain carried by a door supported spring roller, a bar joined to the free edge of said curtain, a further bar adjacent the outer face of said glass, offset portions on said further bar projecting through said door opening above and beneath said glass to engage said bar, a foot terminating each of said offset portions, rollers mounted on said foot, track means in said door for said rollers, a spring plate on said foot contacting with said door, said plate serving to retain said curtain in any extended position.

12. In a film viewing cabinet, a viewing glass, a roller mounted masking curtain adjacent the inner face of said glass, a curtain operating member adjacent the outer face of said glass, means supporting and connecting said member with said curtain, spring means on said member, said spring means serving to secure a film against said glass.

13. In a film viewing cabinet, a viewing glass, an extendible masking curtain adjacent the inner face of said glass, a curtain operating member adjacent the outer face of said glass, means supporting and connecting said member with the free edge of said curtain, a spring clip on said member, a roller on said clip, said roller being pressure engaged with said glass, said roller serving to secure a film against said glass.

14. In a film viewing cabinet having a compartment, a door closing an open side of said compartment, a film viewing glass in said door, means framing said glass, said means being spaced inwardly from said door and providing an opening into said compartment entirely circumscribing said glass.

15. In a film viewing cabinet having a compartment, a frame in one wall of said compartment, a viewing glass on said frame, means mounting and supporting said glass in spaced relationship with said frame whereby to provide an offset opening in said wall entirely circumscribing said glass.

16. In a cabinet of the class described having a compartment, a viewing glass closing one wall of said compartment, said glass being entirely circumscribed by an opening, a masking curtain for covering said glass, a roller supporting said curtain, guide means connected with said curtain, and further means projecting through said opening to the exterior of said cabinet and serving as an operator to move said curtain.

17. In a cabinet of the class described having a compartment, a viewing glass in one wall of said compartment, means supporting said glass inwardly of said wall to provide an offset opening from the exterior to the interior of said compartment, a roller mounted masking curtain for covering said glass, guide means connected with said curtain, and an operator connected with the free edge of said curtain, said operator projecting through said opening to the exterior of said cabinet.

18. In a cabinet of the class described having a compartment, a viewing glass in one wall of said compartment, means supporting said glass to provide an opening from the exterior to the interior of said cabinet, an extendible masking curtain in said compartment immediately adjacent said glass, guide means for maintaining alignment of said curtain with said glass, an operator connected with the free edge of said curtain, said operator projecting through said opening to the exterior of said cabinet and constituting the means by which to extend said curtain.

THEODORE T. HAAG.